(12) United States Patent
Sakugawa

(10) Patent No.: US 6,782,968 B2
(45) Date of Patent: Aug. 31, 2004

(54) AUTOMATIC STEERING APPARATUS FOR VEHICLE AND CONTROL METHOD OF SAME

(75) Inventor: Jun Sakugawa, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/356,539

(22) Filed: Feb. 3, 2003

(65) Prior Publication Data

US 2003/0168275 A1 Sep. 11, 2003

(30) Foreign Application Priority Data

Mar. 6, 2002 (JP) ........................................ 2002-060749

(51) Int. Cl.$^7$ ................................................ B62D 5/04
(52) U.S. Cl. ........................ 180/446; 180/443; 180/444; 701/41; 701/42
(58) Field of Search ............................... 180/446, 443, 180/444; 701/41, 42

(56) References Cited

U.S. PATENT DOCUMENTS

| | | | | |
|---|---|---|---|---|
| 5,072,803 A | * | 12/1991 | Kilian et al. ................. | 180/422 |
| 5,774,819 A | * | 6/1998 | Yamamoto et al. ........... | 701/41 |
| 5,913,375 A | | 6/1999 | Nishikawa ................... | 180/168 |
| 6,053,270 A | | 4/2000 | Nishikawa et al. ......... | 180/168 |
| 6,102,151 A | * | 8/2000 | Shimizu et al. ............. | 180/446 |
| 6,178,365 B1 | | 1/2001 | Kawagoe et al. ............. | 701/41 |
| 6,240,350 B1 | * | 5/2001 | Endo ............................ | 701/41 |
| 6,382,345 B2 | * | 5/2002 | Kada et al. .................. | 180/446 |
| 6,505,702 B1 | * | 1/2003 | Shinmura et al. ........... | 180/446 |
| 6,687,589 B2 | * | 2/2004 | Kanda .......................... | 701/41 |
| 2003/0144780 A1 | * | 7/2003 | Recker et al. ................ | 701/41 |

FOREIGN PATENT DOCUMENTS

| | | | |
|---|---|---|---|
| EP | 1 205 372 A2 | 5/2002 | |
| EP | 1 227 027 A2 | 7/2002 | |
| JP | A 5-77751 | 3/1993 | |
| JP | A 11-78949 | 3/1999 | |
| JP | 2001260925 A | * 9/2001 | ............ B62D/6/00 |

* cited by examiner

Primary Examiner—Lesley D. Morris
Assistant Examiner—Daniel Yeagley
(74) Attorney, Agent, or Firm—Oliff & Berridge, PLC

(57) ABSTRACT

A target relative rotation angle of automatic steering is calculated; a target current for assist steering during automatic steering is calculated based on the sum of a torque that inhibits a reaction force of the automatic steering from acting on a steering wheel, a torque that cancels out torque that acts resulting from self-aligning torque of the steered wheels, and a torque according to a steering angle; a target current for assist steering to reduce a steering load on a driver is calculated; a weight of the target current is calculated to increase as the target relative rotation angle increases; and an electric power steering unit is controlled, with a weight sum of the target currents as a final target current.

14 Claims, 6 Drawing Sheets

AUTOMATIC STEERING APPARATUS FOR VEHICLE AND CONTROL METHOD OF SAME

BACKGROUND OF THE INVENTION

1. Field of the Invention

The invention relates to a steering apparatus for a vehicle such as an automobile, and a control method thereof. More particularly, the invention relates to an automatic steering apparatus for a vehicle that automatically steers steered wheels as necessary, as well as a control method of that automatic steering apparatus.

2. Description of the Related Art

An electric power steering unit, such as that disclosed in Japanese Patent Laid-Open Publication No. 11-78949, for example, has been known, which uses drive torque from a motor of the electric power steering unit to provide steering assist when a vehicle is being steered by a driver, and which further automatically steers steered wheels relative to a steering wheel as necessary.

According to the electric power steering unit in the foregoing publication, it is possible to perform steering assist and, when necessary, automatic steering using one motor. It is difficult, however, to prevent reaction torque generated when the electric power steering unit steers the steered wheels, from being transmitted to the steering wheel, as well as prevent the driver from feeling an unpleasant sensation from that reaction torque. Moreover, the driver also feels a sudden change in torque through the steering wheel when the steering mode changes between steering by the driver and automatic steering.

In order to solve the foregoing problems, an automatic steering apparatus has been proposed that is disclosed in Japanese Patent Laid-Open Publication No. 5-77751, for example. This automatic steering apparatus is provided in a steering system between the steering wheel and the steered wheels, and includes a variable transfer ratio unit (i.e., a variable steering angle mechanism) as steer driving means that steers the steered wheels relative to the steering wheel, and a power steering unit as steering assist force generating means provided in the steering system. Further, this automatic steering apparatus automatically steers the steered wheels using the variable transfer ratio unit, and cancels reaction torque generated by the variable transfer ratio unit during automatic steering with a steering assist force from the power steering unit.

However, in this type of automatic steering apparatus, it is difficult to accurately estimate the reaction torque generated by the variable transfer ratio unit during automatic steering. As a result, it is difficult to accurately cancel out that reaction torque with the steering assist force from the power steering unit. Accordingly, it is difficult to effectively prevent the driver from feeling an unpleasant sensation. It is also difficult to effectively prevent the torque felt by the driver through the steering wheel from changing when the steering mode changes between steering by the driver and automatic steering.

SUMMARY OF THE INVENTION

It is an object of the invention to effectively minimize a sense of unpleasantness felt by a driver during automatic steering, and effectively reduce a change in torque felt by the driver through the steering wheel when a steering mode changes between steering by the driver and automatic steering, by controlling an assist steering force generating unit so that a torque acting on the steering wheel during automatic steering becomes a target torque during automatic steering.

A first aspect of the invention relates to a semi-steer-by-wire automatic steering apparatus for a vehicle. The semi-steer-by-wire automatic steering apparatus provided with an assist steering unit, which is provided in a steering system between a steering wheel and steered wheels, and which assists with steering of, and which automatically steers, the steered wheels relative to the steering wheel; an assist steering force generating unit, which is provided in the steering system, and which generates an assist steering force that assists with steering the steered wheels; a detector that detects a torque of the steering system; and a controller which controls the assist steering unit and the assist steering force generating unit. Further, the controller calculates a target assist steering amount of the assist steering unit and controls the assist steering unit based on the target assist steering amount. Further, the controller calculates a first target assist steering force to control a torque acting on the steering wheel to a target torque during non-automatic steering based on the torque detected by the detector; calculates a second target assist steering force to control a torque acting on the steering wheel to a target torque during automatic steering based on the target assist steering amount and a running state of the vehicle; calculates a final target assist steering force as a weight sum of the first and second target assist steering forces; controls the assist steering force generating unit based on the final target assist steering force. Further, the controller decreases the weight of the first target assist steering force and increases the weight of the second target assist steering force during automatic steering as compared to during non-automatic steering.

According to the foregoing first aspect of the invention, the first target assist steering force to control the torque acting on the steering wheel to the target torque during non-automatic steering, is calculated based on the detected torque of the steering system. Also, the second target assist steering force to control the torque acting on the steering wheel to the target torque during automatic steering, is calculated based on the target assist steering amount of the assist steering unit and the running state of the vehicle. The final target assist steering force is calculated as the weight sum of the first and second target assist steering forces. The assist steering unit is controlled based on the target assist steering amount and the assist steering force generating unit is controlled based on the final target assist steering force. Further, the weight of the first target assist steering force is decreased and the weight of the second target assist steering force is increased during automatic steering as compared to during non-automatic steering. Accordingly, during non-automatic steering, it is possible to control the torque acting on the steering wheel to a value near the target torque during non-automatic steering, and during automatic steering, it is possible to control the torque acting on the steering wheel to a value near the target torque during automatic steering. Therefore, by setting the target torque during automatic steering appropriately based on the target assist steering amount of the assist steering unit and the running state of the vehicle, it is possible to effectively minimize unpleasantness felt by the driver during automatic steering.

A second aspect of the invention relates to a control method for a semi-steer-by-wire type automatic steering apparatus for a vehicle. The semi-steer-by-wire type automatic steering apparatus has an assist steering unit, which is provided in a steering system between a steering wheel and steered wheels, which assists with steering of, and which automatically steers, the steered wheels relative to the steering wheel, and an assist steering force generating unit, which is provided in the steering system, which generates an assist steering force that assists with steering the steered wheels. The control method of the second aspect of the invention includes the steps of calculating a target assist steering amount of the assist steering unit; detecting a torque of the steering system; calculating a first target assist steering force to control a torque acting on the steering wheel to a target torque during non-automatic steering based on the detected torque; calculating a second target assist steering force to control a torque acting on the steering wheel to a target torque during automatic steering based on the target assist steering amount and a running state of the vehicle; calculating a final target assist steering force as a weight sum of the first and second target assist steering forces; controlling the assist steering unit based on the target assist steering amount; controlling the assist steering force generating unit based on the final target assist steering force; and decreasing the weight of the first target assist steering force and increasing the weight of the second target assist steering force during automatic steering as compared to during non-automatic steering.

According to this method, it is possible to effectively minimize unpleasantness felt by the driver during automatic steering, just as with the first aspect of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

The preferred embodiments of the invention will hereinafter be described in detail with reference to the appended drawings.

Figure 1:
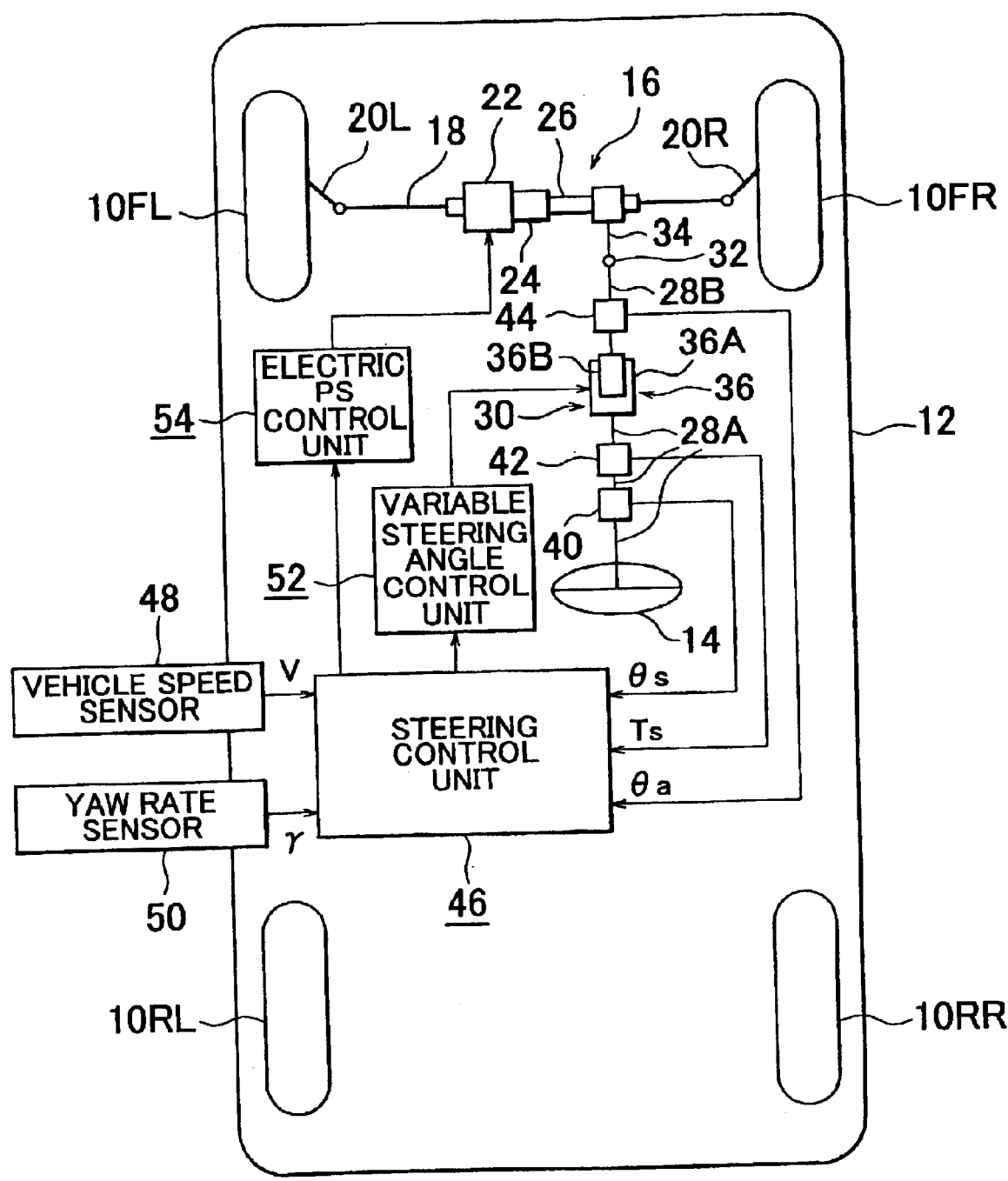
FIG. 1 is a block diagram schematically showing one exemplary embodiment of an automatic steering apparatus for a vehicle according to the invention, which is applied to a semi-steer-by-wire type vehicle provided with a variable-angle steering unit and an electric power steering unit.

FIG. 1 is a block diagram schematically showing one exemplary embodiment of an automatic steering apparatus for a vehicle according to the invention, which is applied to a semi-steer-by-wire type vehicle provided with a variable-angle steering unit and an electric power steering unit.

In FIG. 1, a vehicle 12 is provided with left and right front wheels 10FL and 10FR, and left and right rear wheels 10RL and 10RR. The left and right front wheels 10FL and 10FR, which are the steered wheels, are steered by a rack and pinion type electric power steering unit 16 via a rack bar 18, and tie rods 20L and 20R. The electric power steering unit 16 is driven in response to an operation of a steering wheel 14 by a driver.

In the exemplary embodiment in the figure, the electric power steering unit 16 is located concentric with the rack. This electric power steering unit 16 includes a motor 22 and a mechanism that converts the rotational torque of the motor 22 into a force in a reciprocating direction of the rack bar 18, for example, a ball-screw type converting mechanism 24. The electric power steering unit 16 reduces the steering load on the driver by generating an assist steering force to drive the rack bar 18 relative to a housing 26. The electric power steering unit 16 can be regarded as an assist steering force generating unit of the invention. This assist steering force generating unit may be one of various constructions that are well-known by those skilled in the art. It is preferable that the assist steering force generating unit is provided between the left and right front wheels and a variable-angle steering unit 30 and generates an assist steering force with respect to the front wheels, to be described later. Alternatively, however, the assist steering force generating unit may also be provided between the steering wheel 14 and the variable-angle steering unit 30 and generate an assist steering force with respect to the left and right front wheels.

The steering wheel 14 is connected to a pinion shaft 34 of the electric power steering unit 16 via an upper steering shaft 28A, which can be regarded as a first steering shaft, the variable-angle steering unit 30, a lower steering shaft 28B, which can be regarded as a second steering shaft, and a joint 32 so as to drive the pinion shaft 34. In the exemplary embodiment in the figure, the variable-angle steering unit 30 includes a motor 36 for the assist steering. The lower end of the upper steering shaft 28A is linked to a housing 36A of the motor 36. The upper end of the lower steering shaft 28B is linked to a rotor 36B of the motor 36.

The variable-angle steering unit 30 provides assist steering force to drive the left and right front wheels 10FL and 10FR, which are the steered wheels, relative to the steering wheel 14 by driving, i.e., rotating the second steering shaft relative to the first steering shaft. The variable-angle steering unit 30 can be regarded as an assist steering unit of the invention.

In particular, in the variable-angle steering unit 30, normally, a maintaining current that inhibits relative rotation of the housing 36A and the rotor 36B is supplied to the motor 36, which keeps the relative rotation angle of the lower steering shaft 28B to the upper steering shaft 28A (simply referred to as the relative rotation angle) at $\theta$. However, during automatic steering, the motor 36 actively rotates the lower steering shaft 28B relative to the upper steering shaft 28A so as to automatically steer the left and right front wheels 10FL and 10FR without relying on a steering operation by the driver.

According to the exemplary embodiment in the figure, a steering angle sensor 40 that detects a rotation angle of the upper steering shaft as a steering angle $\theta s$ and a torque sensor 42 that detects a steering torque Ts are provided on the upper steering shaft 28A. Also, a steering angle sensor 44 that detects a rotation angle of the lower steering shaft as an actual steering angle $\theta a$ of the left and right front wheels is provided on the lower steering shaft 28B. Signals output of these sensors are sent to a steering control unit 46. The steering control unit 46 also receives signals indicative of a vehicle speed V detected by a vehicle speed sensor 48 and a yaw rate γ of the vehicle detected by a yaw rate sensor 50.

The signal indicative of the steering angle θa and the signal indicative of the vehicle speed V are also input via the steering control unit 46 to a variable steering angle control unit 52 that controls the variable-angle steering unit 30. Also, the signal indicative of the steering torque Ts and the signal indicative of the vehicle speed V are also input via the steering control unit 46 to an electric power steering (electric PS) control unit 54 that controls the electric power steering unit 16. Further, the signal indicative of the steering angle θa detected by the steering angle sensor 44 is used to align the straight ahead position of the left and right front wheels 10FL and 10FR with the neutral position of the steering wheel 14 after the automatic steering has ended.

The steering control unit 46 calculates a target yaw rate γt of the vehicle. In addition, the steering control unit 46 also calculates a target relative rotation angle θr of the lower steering shaft 28B with respect to the upper steering shaft 28A as a target assist steering amount of the variable-angle steering unit 30 to reduce a difference Δδ between the target yaw rate γt and a yaw rate γ of the vehicle detected by the yaw rate sensor 50. The steering control unit 46 then outputs a command signal indicative of the target relative rotation angle θr to the variable steering angle control unit 52.

Further, the steering control unit 46 calculates a self-aligning torque Tsat from road surface reaction force on the left and right front wheels; calculates a target torque Tsw of the steering wheel based on the steering angle θs; calculates a target torque Ttc during automatic steering based on the target relative rotation angle Or, the self-aligning torque Tsat, and a target torque Tsw; and calculates as a target current corresponding to the second target assist steering force a target current Itc for torque control for the motor 22 of the electric power steering control unit 54 during the automatic steering based on the target torque Ttc. The steering control unit 46 then outputs a command signal indicative of the target current Itc for torque control to the electric power steering control unit 54.

Normally when the driver is steering, the variable steering angle control unit 52 keeps the relative rotation angle of the variable-angle steering unit 30 at 0. Also, when the steering control unit 46 receives a signal indicative of the target relative rotation angle θr, the variable steering angle control unit 52 controls the motor 36 of the variable-angle steering unit 30 based on the target relative rotation angle θr so as to rotate the lower steering shaft 28B the target relative rotation angle Or relative to the upper steering shaft 28A. As a result, the left and right front wheels 10FL and 10FR are automatically steered and the difference Δγ in the yaw rate of the vehicle is reduced such that the running stability during turning of the vehicle improves.

The electric power steering control unit 54 calculates as a target current corresponding to a first target assist steering force a target current Ips for assist steering for the motor 22 of the electric power steering unit 16 according to the steering torque Ts and the vehicle speed V in order to reduce the steering load on the driver; calculates the weight ω of the target current Itc for torque control based on the target relative rotation angle θr; and calculates a final target current It as the weight sum of the target current Ips for assist steering based on the weight ω and the target current Itc for torque control. The electric power steering control unit 54 then controls the motor 22 of the electric power steering unit 16 based on this final target current It.

In particular, according to the exemplary embodiment in the figure, the electric power steering control unit 54 calculates the final target current It with the weight of the target current Ips for assist steering as (1−ω)) and the weight of the target current Itc for torque control as ω. When automatic steering is not performed (i.e., during non-automatic steering), the electric power steering control unit 54 sets the weight ω to 0 and when automatic steering is performed (i.e., during automatic steering), the electric power steering control unit 54 sets the weight ω to 1. By variably setting the weight ω to according to the target relative rotation angle θr such that the weight ω approaches 1 the larger the target relative rotation angle θr, the electric power steering control unit 54 gradually changes the weight ω when the steering mode is changed between non-automatic steering and automatic steering.

Also, the electric power steering control unit 54 reduces the speed of change in the weight ω when the steering mode is changed between non-automatic steering and automatic steering the larger the self-aligning torque Tsat by reducing the ratio of the amount of change in the weight ω to the amount of change in the target relative rotation angle θr the larger the self-aligning torque Tsat.

Although not shown in detail in FIG. 1, the steering control unit 46, the variable steering angle control unit 52, and the electric power steering control unit 54 each have a CPU, ROM, RAM, and an input/output port device. The steering control unit 46, the variable steering angle control unit 52, and the electric power steering control unit 54 may each include a microcomputer and a drive circuit in which the CPU, ROM, RAM, and input/output port device are all bi-directionally connected together via a common bus. Also, the steering angle sensor 40 detects the steering angle θs, the steering angle sensor 44 detects the steering angle θa, the torque sensor 42 detects the steering torque Ts, and the yaw rate sensor 50 detects the yaw rate γ, with steering the vehicle to the left yielding a positive value.

Figure 2:
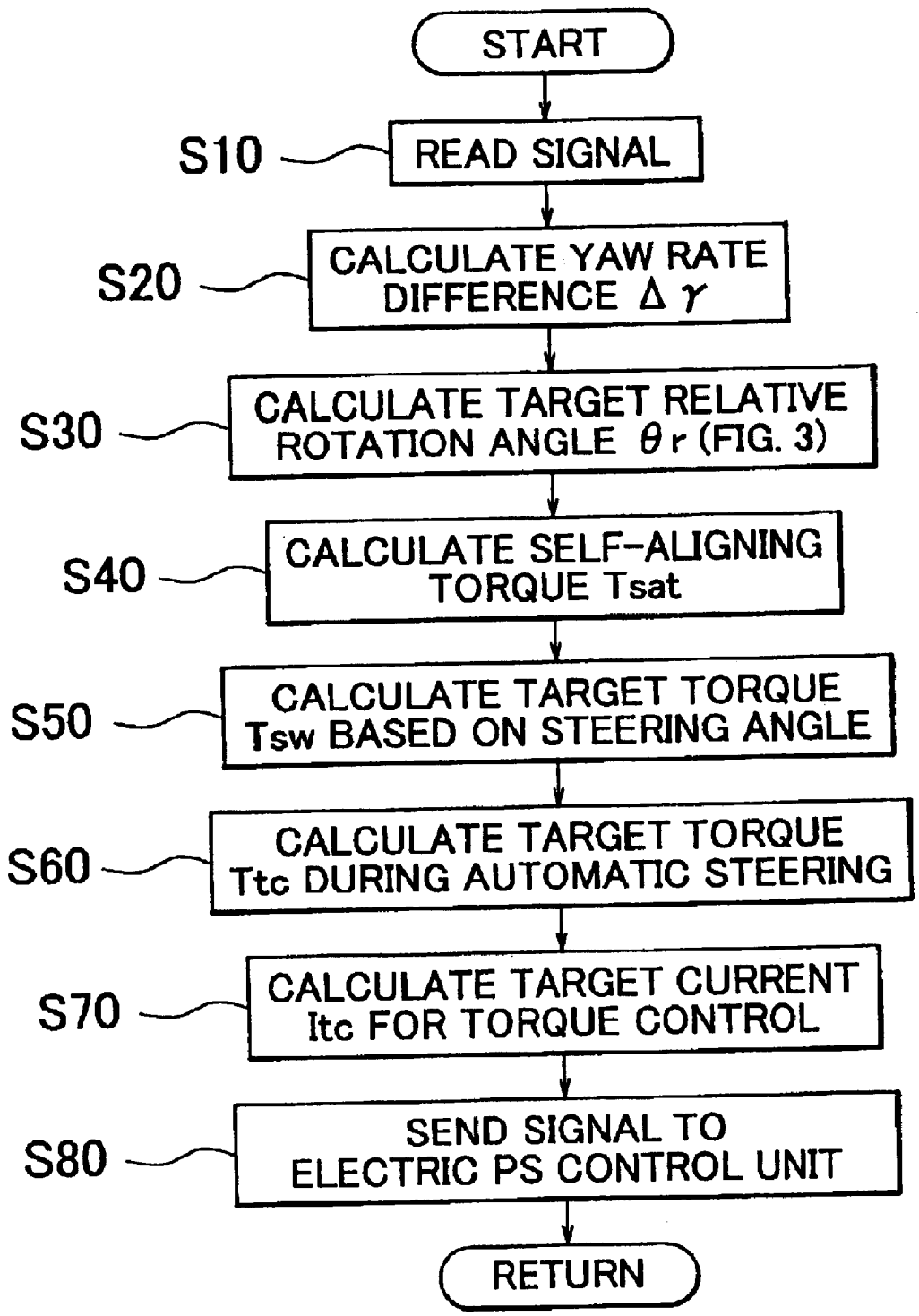
FIG. 2 is a flowchart illustrating a routine for calculating a target relative rotation angle and a target current for torque control to be performed by a steering control unit in the exemplary embodiment of the invention.

Next, a routine for calculating a target relative rotation angle and a target current for torque control performed by the steering control unit 46 according to the exemplary embodiment in FIG. 1 shall be described with reference to the flowchart in FIG. 2. The control according to the flowchart shown in FIG. 2 starts with the turning on of an ignition switch, now shown, and is repeatedly executed at predetermined intervals of time.

First in step S10, the signal indicative of the steering angle θs and the like is read. Then in step S20, an actual steering angle δ of the front wheels is calculated based on the steering angle θs; the target yaw rate γt of the vehicle is calculated according to Expression 1 below, with H as the wheel base and Kh as the stability factor; and the difference Δδ(=γt−γ) between the target yaw rate γt and the detected yaw rate γ is calculated.

$$\gamma t = V \times \delta / (1 + Kh \times V^2) H \tag{1}$$

Figure 3:
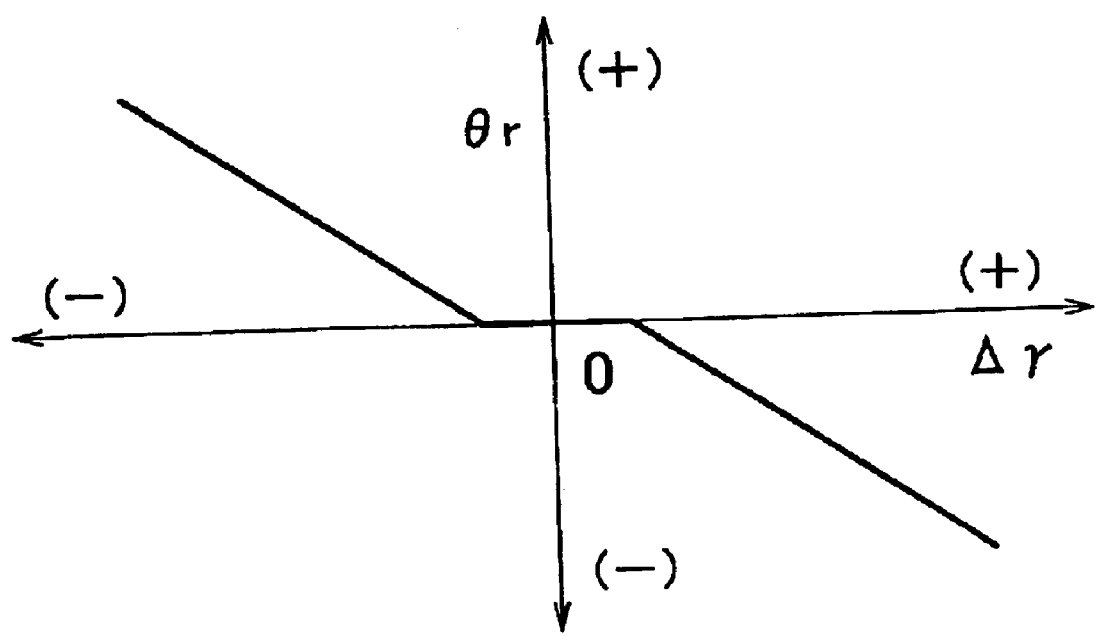
FIG. 3 is a graph showing the relationship between a yaw rate difference $\Delta\gamma$ and a target relative rotation angle $\theta r$.

In step S30, the target assist steering amount of the variable-angle steering unit 30, i.e., the target relative rotation angle θr of the lower steering shaft 28B with respect to the upper steering shaft 28A, is calculated according to a map corresponding to the graph shown in FIG. 3, based on the yaw rate difference Δγ.

In step S40, the self-aligning torque Tsat that is caused by the force from the road surface acting on the left and right front wheels is calculated according to a theoretical expression based on the Fiala model which is well-known by those skilled in the art. The self-aligning torque Tsat may be calculated as the sum of an assist torque Taps of the electric power steering unit 16 and a torque Tp detected in the pinion shaft 34 or the lower steering shaft 28B. Further, the self-aligning torque Tsat may also be estimated based on an axial force detected in the tie rods 20L and 20R, for example.

In step S50, the target torque Tsw of the steering wheel based on the steering angle θs (i.e., the torque corresponding to the steering angle θs) is calculated according to Expression 2 below, with Kp, Kd, and Kdd as positive constants, and θsd as the derivative of the steering angle θs, and θstd as the second stage derivative of the steering angle θs, as is disclosed in Japanese Patent Laid-Open Publication No. 2000-108917, for example.

$$Tsw = Kp\theta s + Kd\theta sd + Kdd\theta std \tag{2}$$

In step S60, the target torque Ttc of the steering wheel during automatic steering is calculated according to Expression 3 below, with I as the inertia moment of the motor 36 and the like of the variable-angle steering unit 30, C as the viscosity coefficient of the variable-angle steering unit 30 and the like, θrd as the derivative of the target relative rotation angle θr, θrtd as the second stage derivative of the target relative rotation angle θr, and Ksat as a positive coefficient. The first and second terms in Expression 3 below are torque for assisting with the automatic steering by the variable-angle steering unit 30 such that reaction torque of the automatic steering does not act on the steering wheel.

$$Ttc = I\theta rtd + C\theta rd + KsatTsat + Tsw \tag{3}$$

In step S70, the target current Itc for torque control during automatic steering is calculated according to Expression 4 below, with the target torque Ttc as a variable and f (Ttc) being a function that calculates the target current Itc for torque control during automatic steering for the motor 22 of the electric power steering unit 16.

$$Itc = f(Ttc) \tag{4}$$

In step S80, a command signal indicative of the target relative rotation angle θr is sent to the variable steering angle control unit 52, while a signal indicative of the target relative rotation angle θr, a signal indicative of the self-aligning torque Tsat, and a command signal indicative of the target current Itc for torque control during automatic steering are sent to the electric power steering control unit 54.

Although not shown in the figure, the variable steering angle control unit 52 receives a command signal indicative of the target relative rotation angle θr from the steering control unit 46, and controls the motor 36 to rotate the lower steering shaft 28B the target relative rotation angle θr relative to the upper steering shaft 28A, thereby automatically steering the left and right front wheels 10FL and 10FR.

Figure 4:
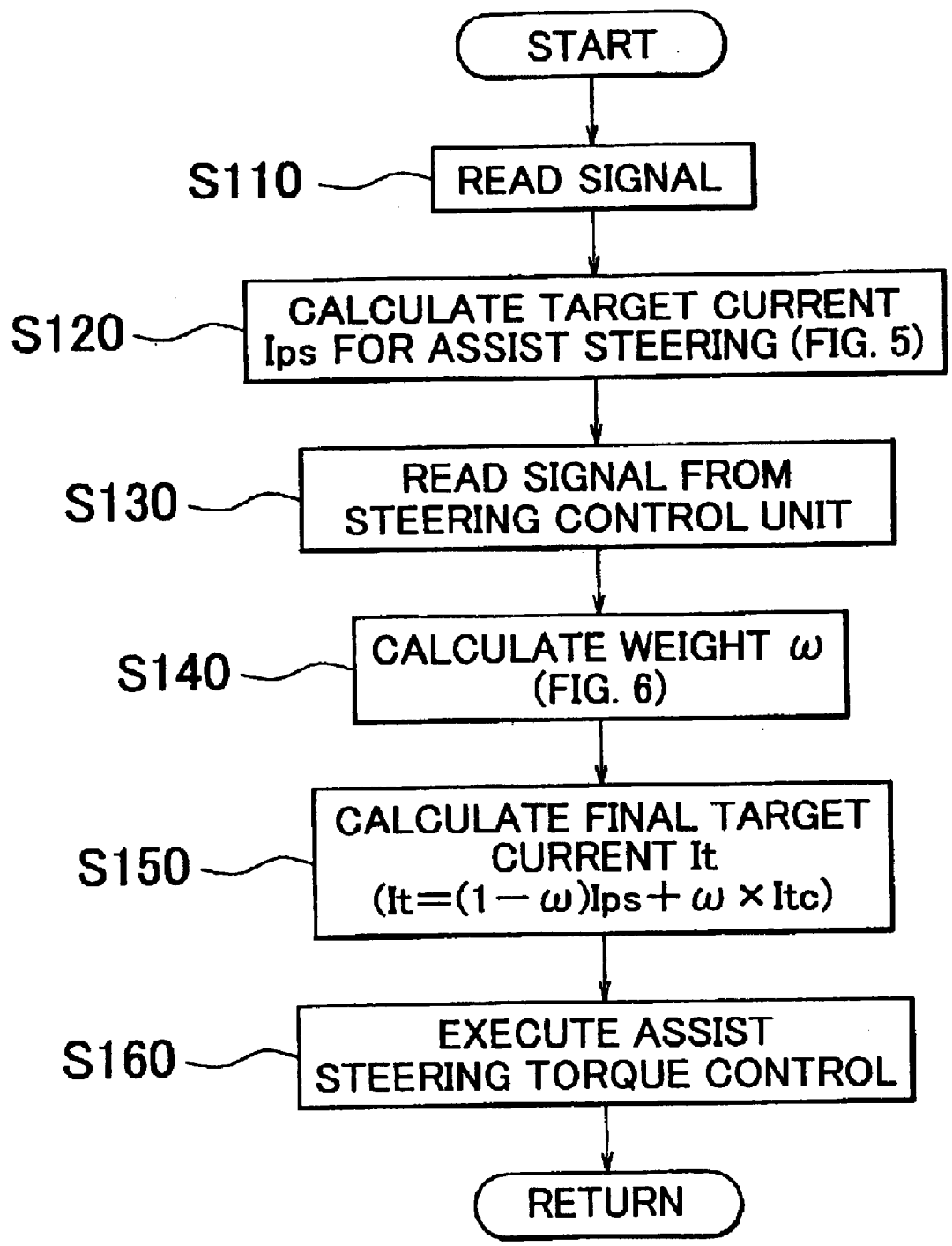
FIG. 4 is a flowchart illustrating a routine for controlling assist steering force performed by an electric power steering control unit in the exemplary embodiment of the invention.

Next, a routine for controlling assist steering force performed by the electric power steering control unit 54 according to the exemplary embodiment shown in FIG. 1 will be described with reference to the flowchart shown in FIG. 4. The control according to the flowchart shown in FIG. 4 starts with the turning on of an ignition switch, now shown, and is repeatedly executed at predetermined intervals of time.

Figure 5:
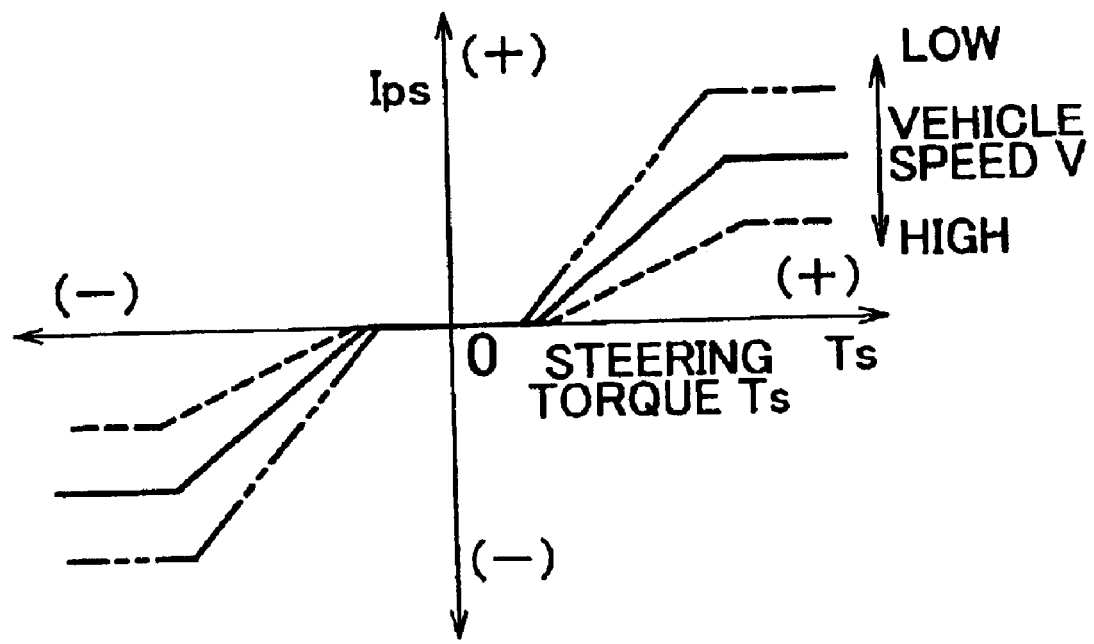
FIG. 5 is a graph showing the relationship between vehicle speed V, steering torque Ts, and target current Ips for assist steering.

First in step S110, the signal indicative of the steering torque Ts detected by the torque sensor 42, and the like is read. Then in step S120, the target current Ips for assist steering for the motor 22 of the electric power steering unit 16 in order to reduce the steering load on the driver is calculated based on the steering torque Ts and the vehicle speed V according to a map corresponding to the graph shown in FIG. 5. As can be seen in FIG. 5, in this case, the target current Ips for assist steering is calculated so as to become larger the larger the steering torque Ts, and smaller the greater the vehicle speed V with the same steering torque Ts.

In step S130, the signal indicative of the target relative rotation angle Or, the signal indicative of the self-aligning torque Tsat, and the command signal indicative of the target current Itc for torque control during automatic steering that were sent by the steering control unit 46 are read.

Figure 6:
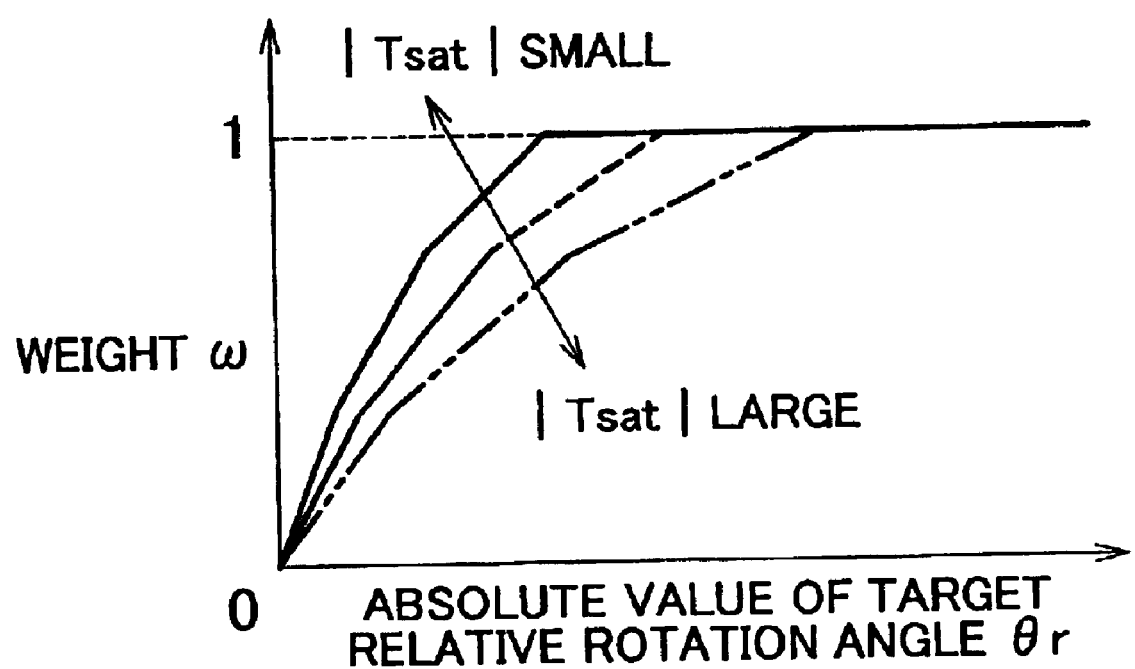
FIG. 6 is a graph showing the relationship between an absolute value of the target relative rotation angle $\theta r$, an absolute value of a self-aligning torque Tsat, and a weight $\omega$.

In step S140, a map is selected for calculating the weight ω according to an absolute value of the self-aligning torque Tsat and the weight ω is calculated according to the selected map, as shown in FIG. 6. As can be seen in FIG. 6, in this case, in all of the maps, the weight ω is set so as to become progressively closer to 1 from 0 as the absolute value of the target relative rotation angle θr increases. Further, a map is selected in which the weight ω in the region where the target relative rotation angle θr is small decreases the larger the absolute value of the self-aligning torque Tsat.

In step S1150, the final target current It for the motor 22 of the electric power steering unit 16 is calculated according to Expression 5 below as the weight sum of the target current Ips for assist steering and the target current Itc for torque control during automatic steering. In step S 160, the motor 22 of the electric power steering unit 16 is controlled based on that final target current It.

$$It = (1-\omega)Ips + \omega \times Itc \tag{5}$$

According to the exemplary embodiment in the figure, in steps S20 and S30, the target assist steering amount of the variable-angle steering unit 30, i.e., the target relative rotation angle θr of the lower steering shaft 28B with respect to the upper steering shaft 28A, is calculated as the target control amount to to make the yaw rate γ of the vehicle the target yaw rate γt and automatically steer the left and right front wheels to turn the vehicle stably. Then, in steps S40 through 60, the target torque Ttc of the steering wheel during automatic steering is calculated based on the drive torque of the variable-angle steering unit 30 based on the target relative rotation angle θr, the self-aligning torque Tsat, and the target torque Tsw of the steering wheel based on the steering angle θs. In step S70, the target current Itc for torque control during automatic steering for the motor 22 of the electric power steering unit 16, i.e., the target current corresponding to the second target assist steering force for controlling the torque acting on the steering wheel 14 during automatic steering to the target torque during automatic steering, is calculated.

Then in step S120, the target current Ips for assist steering for the motor 22 of the electric power steering unit 16, i.e., the target current corresponding the first target assist steering force to control the torque acting on the steering wheel 14 during non-automatic steering to the target torque during non-automatic steering, is calculated as a value corresponding to the assist steering torque to reduce the steering load on the driver. In step S140, the weight ω of the target current Itc for torque control is calculated so as to increase the larger the absolute value of the target relative rotation angle θr. In step S150, the final target current It for the motor 22 of the electric power steering unit 16 is calculated as the weight sum of the target current Ips for assist steering and the target current Itc for torque control, with the weight of the target current Ips for assist steering as (1−ω) and the weight of the target current Itc for torque control as ω during automatic steering. In step S160, the motor 22 of the electric power steering unit 16 is controlled based on the final target current It.

The target torque Ttc of the steering wheel during automatic steering in this case, is calculated according to Expression 3 above as the sum of the torque (Iθrtd+Cθrd) that inhibits a reaction force from the automatic steering by the variable-angle steering unit 30 from acting on the steering wheel 14, the torque (KsatTsat) that cancels out the torque acting on the steering wheel 14 that results from the self-aligning torque of the left and right front wheels, and the torque (target torque Tsw) according to the steering angle θs. The target current Ips for assist steering is calculated based on the target torque Ttc.

Because the torque (Iθrtd+Cθrd) inhibits a reaction force from the automatic steering from acting on the steering wheel 14, the torque (KsatTsat) inhibits the self-aligning torque generated according to the actual steering angle of the left and right front wheels during automatic steering from acting on the steering wheel 14, and the torque (Tsw) results in a torque corresponding to the steering angle θs, i.e., an operation of the steering wheel 14 by the driver, being imparted to the steering wheel 14, it is possible to effectively minimize the sense of unpleasantness by the driver which results from the fact that the reaction force from the automatic steering during automatic steering acts on the steering wheel 14, and the fact that the actual self-aligning torque differs from the self-aligning torque that corresponds to the steering angle θs because the actual steering angle of the left and right front wheels does not correspond to the steering angle θs.

In particular, according to the exemplary embodiment in the figure, when the steering mode is changed from non-automatic steering to automatic steering, the weight (1−ω) of the target current Ips for assist steering gradually decreases from 1 and the weight ω of the target current Itc for torque control gradually increases from 0 as the absolute value of the target relative rotation angle θr increases. When the steering mode changes from automatic steering to non-automatic steering, the weight ω of the target current Itc for torque control gradually decreases from 1 and the weight (1−ω) of the target current Ips for assist steering gradually increases from 0 as the absolute value of the target relative rotation angle θr decreases. Therefore, when the steering mode changes between automatic steering and non-automatic steering, it is possible to reliably and effectively minimize a sudden change in the assist steering force of the electric power steering unit 16, as well as a sense of unpleasantness on the driver brought about by that sudden change in assist steering force.

Further, according to the exemplary embodiment in the figure, a map is selected in which the weight ω in a region where the target relative rotation angle θr is small decreases the larger the absolute value of the self-aligning torque Tsat. Therefore, the change in weight of the target current Ips for assist steering and the target current Itc for torque control when the steering mode changes between non-automatic steering and automatic steering becomes gradual as the absolute value of the self-aligning torque Tsat increases and the road surface reaction force on the steered wheels also increases. Accordingly, it is possible to reliably and effectively inhibit the final target current It from changing suddenly and minimize a sense of unpleasantness on the driver brought about by that sudden change in torque acting on the steering wheel 14 when the steering mode changes between non-automatic steering and automatic steering.

As disclosed in Japanese Patent Laid-Open Publication No. 5-77751, mentioned above, when the assist steering force generating unit is provided on the steering wheel 14 side of the variable-angle steering unit 30 as the assist steering unit and steering assist is also provided using the assist steering force of the assist steering force generating unit, the assist steering force must be transmitted to the steered wheels via the variable-angle steering unit 30. This unit that a relatively large load is placed on the variable-angle steering unit. As a result, the variable-angle steering unit must be very strong and it is not able to be used as a small gear device. As a result, the steering system is not able to be compact.

According to the exemplary embodiment in the figure, providing the electric power steering unit 16, which can be regarded as the assist steering force generating unit of the invention, on the steered wheels side of the variable-angle steering unit 30, which can be regarded as the assist steering unit of the invention, obviates the need to provide another assist steering force generating unit on the steering wheel side with respect to the assist steering unit. Further, during non-automatic steering, the electric power steering unit 16 can generate steering assist torque, and during automatic steering, it can automatically steer, along with variable-angle steering unit 30, the steered wheels, as well as controlling the torque acting on the steering wheel to the target torque.

While the invention has been described with reference to specific preferred embodiments thereof, it is to be understood that the invention is not limited thereto, and many modifications and variations therein will readily occur to those skilled in the art. Accordingly, all such variations and modifications are included within the intended scope of the invention.

For example, in the foregoing exemplary embodiment, the target torque Ttc of the steering wheel that corresponds to the second target assist steering force during automatic steering is calculated according to the foregoing Expression 3. However, the target torque Ttc is not limited to being calculated as the target current corresponding to the second target assist steering force for controlling the torque acting on the steering wheel to the target torque during automatic steering, based on the target assist steering amount and the running state of the vehicle. One of various modes of calculation may be used as long as the target torque Ttc is preferably calculated as the target current corresponding to the second target assist steering force which is calculated based on i) a force that inhibits the reaction force when the assist steering means assists with steering, or automatically steers, the steered wheels based on the target assist steering amount, from acting on the steering wheel, ii) a force that cancels out the self-aligning torque so as to inhibit the self-aligning torque from being transmitted to the steering wheel, and iii) a force that generates steering torque according to a driver-induced steering state.

Also, in the foregoing exemplary embodiment, the weight ω can be variably set according to the absolute value of the self-aligning torque Tsat by selecting the map in which the weight ω in the region where the target relative rotation angle θr is small decreases the larger the absolute value of the self-aligning torque Tsat. Alternatively, however, the variable setting of the weight ω corresponding to the absolute value of the self-aligning torque Tsat may be omitted.

Further in the foregoing exemplary embodiment, the weight ω is variably set based on the absolute value of the target relative rotation angle θr, and it is determined whether the vehicle is being automatically steered or non-automatically steered based on the absolute value of that target relative rotation angle θr. Alternatively, however, the weight ω may be variably set according to an arbitrary value as long as the value corresponds to the target steering amount of the automatic steering by the variable-angle steering unit 30. For example, a value of the horizontal axis in the graph in FIG. 6 may be replaced with the sum of the first and second terms in the foregoing Expression 3.

Also, in the foregoing exemplary embodiment, the target current Itc for torque control calculated based on the target torque Ttc according to the foregoing Expression 4 is output to the electric power steering control unit 54. Alternatively, however, the command signal indicative of the target relative rotation angle θr may be output to the variable steering angle control unit 52 and the electric power steering control unit 54, and the target current Itc for torque control may be calculated in the electric power steering control unit 54 according to the foregoing Expressions 3 and 4.

Further, in the foregoing exemplary embodiment, during normal steering by the driver, the variable steering angle control unit 52 keeps the relative rotation angle of the variable-angle steering unit 30 at 0. Alternatively, however, during normal steering in which automatic steering is not performed, the variable-angle steering unit 30 may also be used as a variable gear ratio unit according to the running state of the vehicle, such that the ratio of the rotation angle of the lower steering shaft 28B to the rotation angle of the upper steering shaft 28A becomes smaller as the vehicle speed V increases, for example.

Also, in the foregoing exemplary embodiment, the target steering amount of the steered wheels is a target steering amount to reduce the difference between the actual yaw rate of the vehicle and the target yaw rate of the vehicle. Alternatively, however, the target steering amount of the steered wheels may be a target steering amount to run the vehicle along a lane marking, as is disclosed in Japanese Patent Laid-Open Publication No. 11-73597, for example, or a target steering amount to avoid an obstacle in front of the vehicle when the obstacle is detected by laser radar or the like, as is disclosed in Japanese Patent Laid-Open Publication No. 10-31799, for example. Further, the target steering amount of the steered wheels may be an arbitrary target steering amount other than those mentioned above.

Further, in the foregoing exemplary embodiment, the variable-angle steering unit 30 is controlled by the variable steering angle control unit 52, the electric power steering unit 16 is controlled by the electric power steering control unit 54, and the variable steering angle control unit 52 and the electric power steering control unit 54 are controlled by the steering control 46. Alternatively, however, at least two of these control units may be integrated into one control unit.

What is claimed is:

1. A semi-steer-by-wire automatic steering apparatus for a vehicle, comprising:
    an assist steering unit, which is provided in a steering system between a steering wheel and steered wheels, and which assists with steering of, and automatically steering, the steered wheels relative to the steering wheel;
    an assist steering force generating unit, which is provided in the steering system, and which generates an assist steering force that assists with steering the steered wheels;
    a first detector that detects a torque of the steering system; and
    a controller which calculates a target assist steering amount of the assist steering unit; calculates a first target assist steering force to control a torque acting on the steering wheel to a target torque during non-automatic steering based on the torque detected by the first detector; calculates a second target assist steering force to control a torque acting on the steering wheel to a target torque during automatic steering based on the target assist steering amount and a running state of the vehicle; calculates a final target assist steering force as a weight sum of the first and second target assist steering forces; controls the assist steering unit based on the target assist steering amount; controls the assist steering force generating unit based on the final target assist steering force; and decreases the weight of the first target assist steering force and increases the weight of the second target assist steering force during automatic steering as compared to during non-automatic steering.

2. The automatic steering apparatus according to claim 1, wherein the controller sets the weight of the second target assist steering force to 0 during non-automatic steering, sets the weight of the first target assist steering force to 0 during automatic steering, and gradually changes the weights of the first and second target assist steering forces when there is a change between non-automatic steering and automatic steering.

3. The automatic steering apparatus according to claim 1, wherein the controller obtains a self-aligning torque from a road surface that acts on the steered wheels and reduces a change gradient of the weights of the first and second target assist steering forces the larger the obtained self-aligning torque.

4. The automatic steering apparatus according to claim 1, wherein
    the automatic steering apparatus includes a second detector that detects a driver-induced steering state
    the controller obtains a self-aligning torque of the steered wheels; calculates the second target assist steering force based on a force that inhibits a reaction force when the assist steering unit assists with steering of, and automatically steers, the steered wheels based on the target assist steering amount, from acting on the steering wheel, a force that cancels out the obtained self-aligning torque so as to inhibit the self-aligning torque from being transmitted to the steering wheel, and a force that generates the detected steering torque according to the driver-induced steering state.

5. The automatic steering apparatus according to claim 4, wherein the second detector detects a steering angle, and the controller calculates a force that generates a steering torque according to the driver-induced steering state based on the steering angle.

6. The automatic steering apparatus according to claim 1, wherein the controller determines whether the vehicle is being automatically steered or non-automatically steered based on the target assist steering amount.

7. The automatic steering apparatus according to claim 1, wherein the sum of the weight of the first target assist steering force and the weight of the second target assist steering force is constant.

8. The automatic steering apparatus according to claim 1, wherein the controller further variably sets the weight of the second target assist steering force according to the target assist steering amount such that the weight of the second target assist steering force gradually increases as the target assist steering amount increases.

9. The automatic steering apparatus according to claim 1, wherein the controller further variably sets the weight of the second target assist steering force according to the amount of self-aligning torque such that the amount of change in the weight of the second target assist steering force decreases with respect to the amount of change in the target assist steering amount as the obtained self-aligning torque increases.

10. The automatic steering apparatus according to claim 1, wherein the assist steering force generating unit is provided in the steering system between the assist steering unit and the steered wheels.

11. The automatic steering apparatus according to claim 10, wherein the steering system includes a first steering shaft and a second steering shaft connected to the steering wheel; and the assist steering unit includes a motor to assist with steering that has a housing coupled to one of the first and second steering shafts and a rotor that is coupled to the other of the first and second steering shafts, which rotates relative to the housing, the assist steering unit driving the second steering shaft relative to the first steering shaft.

12. The automatic steering apparatus according to claim 11, wherein the controller calculates the target assist steering amount of the assist steering unit as a target relative rotation angle of the second steering shaft with respect to the first steering shaft.

13. The automatic steering apparatus according to claim 1, wherein the assist steering force generating unit is an electric power steering unit.

14. A control method for a semi-steer-by-wire automatic steering apparatus for a vehicle having an assist steering unit, which is provided in a steering system between a steering wheel and steered wheels, which assists with steering of, and automatically steering, the steered wheels relative to the steering wheel, and an assist steering force generating unit, which is provided in the steering system, which generats an assist steering force that assists with steering the steered wheels, the control method by comprising:

calculating a target assist steering amount of the assist steering unit;

detecting a torque of the steering system;

calculating a first target assist steering force to control a torque acting on the steering wheel to a target torque during non-automatic steering based on the detected torque;

calculating a second target assist steering force to control a torque acting on the steering wheel to a target torque during automatic steering based on the target assist steering amount and a running state of the vehicle;

calculating a final target assist steering force as a weight sum of the first and second target assist steering forces;

controlling the assist steering unit based on the target assist steering amount;

controlling the assist steering force generating unit based on the final target assist steering force; and decreasing the weight of the first target assist steering force and increasing the weight of the second target assist steering force during automatic steering as compared to during non-automatic steering.

* * * * *